(12) United States Patent
Park et al.

(10) Patent No.: US 9,505,956 B2
(45) Date of Patent: Nov. 29, 2016

(54) COMPOSITION OF THE HOT-MELT ADHESIVE IMPROVED COLD RESISTANCE

(71) Applicants: SK Innovation Co., Ltd., Seoul (KR); SK Global Chemical Co., Ltd., Seoul (KR)

(72) Inventors: Jae Young Park, Daejeon (KR); Kwang Jin Chung, Daejeon (KR); Seung Gweon Hong, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 138 days.

(21) Appl. No.: 14/208,603

(22) Filed: Mar. 13, 2014

(65) Prior Publication Data

US 2014/0316053 A1  Oct. 23, 2014

(30) Foreign Application Priority Data

Mar. 14, 2013  (KR) .................. 10-2013-0027311

(51) Int. Cl.
| | |
|---|---|
| *C08G 18/67* | (2006.01) |
| *C09J 11/08* | (2006.01) |
| *C09J 175/04* | (2006.01) |
| *C09J 167/00* | (2006.01) |
| *C09J 169/00* | (2006.01) |
| *C08G 18/44* | (2006.01) |
| *C09J 175/06* | (2006.01) |

(52) U.S. Cl.
CPC ............ *C09J 11/08* (2013.01); *C08G 18/44* (2013.01); *C09J 167/00* (2013.01); *C09J 169/00* (2013.01); *C09J 175/04* (2013.01); *C09J 175/06* (2013.01); *C08G 2170/20* (2013.01)

(58) Field of Classification Search
CPC ..... C09J 169/00; C09J 175/04; C09J 167/00
USPC ........................................... 524/527
See application file for complete search history.

(56) References Cited

U.S. PATENT DOCUMENTS

| | | | | |
|---|---|---|---|---|
| 4,833,036 A | * | 5/1989 | Cannarsa ............... | C08G 64/34 156/327 |
| 5,149,589 A | * | 9/1992 | Naritomi ................ | C08L 33/10 428/412 |
| 5,973,056 A | | 10/1999 | Ohtsuka et al. | |
| 2006/0293452 A1 | | 12/2006 | Chou et al. | |
| 2008/0009591 A1 | * | 1/2008 | Kim .......................... | C08J 5/18 525/92 F |
| 2011/0229721 A1 | | 9/2011 | Hoch et al. | |
| 2012/0121878 A1 | | 5/2012 | Bilcai et al. | |
| 2012/0165441 A1 | * | 6/2012 | Hong ....................... | C09J 11/08 524/108 |
| 2012/0196958 A1 | * | 8/2012 | Park .................... | C08G 18/4208 524/14 |

FOREIGN PATENT DOCUMENTS

| | | |
|---|---|---|
| CN | 101072825 A | 11/2007 |
| CN | 102449085 A | 5/2012 |
| WO | 2012091327 A2 | 7/2012 |

* cited by examiner

*Primary Examiner* — Jane L Stanley
(74) *Attorney, Agent, or Firm* — The Webb Law Firm

(57) ABSTRACT

Provided is a hot-melt adhesive composition having a cold resistance, and more particularly, a hot-melt adhesive composition including an aliphatic polycarbonate resin obtained by copolymerization of carbon dioxide and polypropylene oxide, and a cold resistance improver.

10 Claims, 1 Drawing Sheet

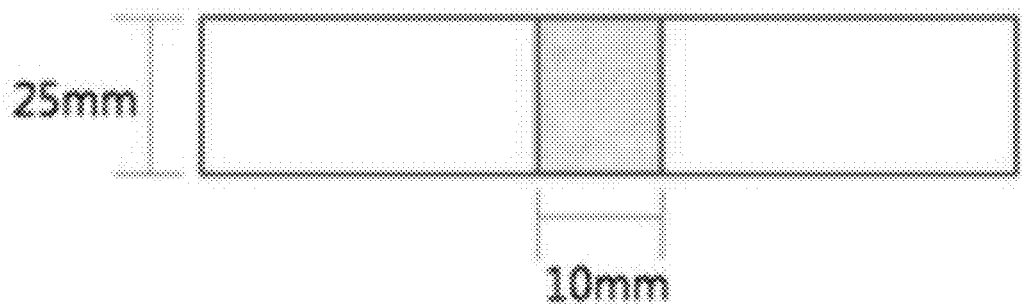

COMPOSITION OF THE HOT-MELT ADHESIVE IMPROVED COLD RESISTANCE

CROSS-REFERENCE TO RELATED APPLICATION

This application claims priority to Korean Patent Application No. 10-2013-0027311, filed Mar. 14, 2013, the disclosure of which is hereby incorporated in its entirety by reference.

TECHNICAL FIELD

The present invention relates to a hot-melt adhesive composition having an improved cold resistance, and more particularly, to a hot-melt adhesive composition including an aliphatic polycarbonate resin obtained by copolymerization of carbon dioxide and at least one of different epoxide compounds, and a cold resistance improver.

BACKGROUND

A hot-melt adhesive, which is an adhesive melted by heat to be applied, has been increasingly used as an environmentally friendly adhesive due to less emission of volatile organic solvents. Recently, in addition to the less emission of the volatile organic compounds which are harmful to human body, efforts to prevent global warming are systematized to protect environment. As a part of the global efforts from various countries, it is preferably demanded to use resins having less emission of carbon dioxide, that is, having a small value of life cycle assessment (LCA). Polycarbonate is prepared using carbon dioxide as a raw material, and has an LCA value of about 1.3, which is remarkably smaller than that of the other polymer resin such as polyethylene or polypropylene. Therefore, a method of decreasing carbon emission quantity in process of preparing a hot-melt adhesive by preparing the hot-melt adhesive using the polycarbonate resin may be provided.

It is general that the existing and general hot-melt adhesive is prepared by containing thermoplastic polymers such as olefin-based copolymer, and the like, as a base polymer, and adding various waxes such as tackifiers or viscosity modifiers thereto. As the base polymer, olefin-based copolymers such as ethylene-vinyl acetate copolymer, ethylene acrylic ester copolymer, ethylene vinyl acetate, and the like, have been widely used due to advantages such as excellent flexibility and cheap cost.

In addition, as the tackifiers improving adhesion, natural resins such as rosin-based resins, terpene-based resins, and the like, and derivatives thereof, and petroleum resins have been largely used, and as waxes decreasing viscosity, petroleum-based waxes, mineral waxes such as coal, low-molecular weight polyethylene waxes, and the like, have been largely used.

The hot-melt adhesive has been widely used in various fields such as automobile, packaging, structural material, electronic material, and the like. However, in the case in which the olefin-based copolymer having small polarity is used as a base polymer, or a surface coating is performed with silicon, wax, or the like, adhesion is not sufficient, and a holt-melt adhesive using a thermoplastic rubber as a base polymer has excellent heat resistance and cold resistance but high viscosity, thereby causing a problem in that workability is decreased.

In addition, in the case in which excessive amount of plasticizers are used in order to reinforce cold resistance or elasticity, compatibility with a base resin is not favorable to occur a phase separation at a workable temperature, thereby causing a bleeding phenomenon, whereby adhesion is reduced, and sufficient strength and flexibility may not be shown at a low temperature.

US Patent Application Publication No. 2011-0229721 (Patent Document 1) discloses a hot-melt adhesive containing an ethylene-vinyl acetate copolymer, a styrene block copolymer, a tackifying resin, and a plasticizer. However, the existing hot-melt adhesive has adhesion with respect to various materials, but does not have adhesion as sufficient as epoxy or urethane adhesive, and has low flexibility and adhesion at a low temperature, thereby having a limitation to be used as an adhesive according to various usages.

In addition, U.S. Pat. No. 5,973,056 (Patent Document 2) discloses a hot-melt adhesive having excellent heat resistance and cold resistance by containing an epoxy-modified block copolymer, a paraffin wax, a tackifier, and an antioxidant, wherein heat resistance and cold resistance are slightly improved due to excellent compatibility between the epoxy-modified block copolymer and the paraffin wax, but mechanical strength and adhesion as the hot-melt adhesive used for various objects are not sufficient.

Therefore, research into an environmentally friendly hot-melt adhesive having an improved cold resistance having excellent strength and flexibility and high adhesion even at a low temperature, and high energy efficiency at the time of being applied, without using a solvent according to adhesion, has been conducted.

RELATED ART DOCUMENT (Patent Document 1) US Patent Application Publication No. 2011-0229721 (Sep. 22, 2011)
(Patent Document 2) U.S. Pat. No. 5,973,056 (Oct. 26, 1999)

SUMMARY

An embodiment of the present invention is directed to providing a hot-melt adhesive composition having an improved cold resistance capable of maintaining adhesion in the related art and improving cold resistance to be easily treated even at a low temperature and have, at a low temperature, adhesion and mechanical strength substantially similar to adhesion and mechanical strength at room temperature, by including an aliphatic polycarbonate resin obtained by copolymerization of carbon dioxide and at least one of different epoxide compounds, and a cold resistance improver.

In addition, another embodiment of the present invention is directed to providing a hot-melt adhesive composition having an improved cold resistance capable of having an excellent compatibility between a polycarbonate resin and a cold resistance improver to improve an adhesion, and remarkably reduce a bleeding phenomenon on a surface of the adhesive and a surface tackiness.

Further, another embodiment of the present invention is directed to providing a hot-melt-adhesive including the hot-melt adhesive composition having an improved cold resistance.

In one general aspect, a hot-melt adhesive composition includes: an aliphatic polycarbonate resin and a cold resistance improver, wherein a tensile strength at −10° C. is 1 to 50 MPa and a tensile elongation at −10° C. is 5 to 300%.

The hot-melt adhesive composition may satisfy the following Equations 1 and 2:

$$0 \leq T_{SD} \leq 15 \quad \text{[Equation 1]}$$

$$0 \leq T_{ED} \leq 300 \quad \text{[Equation 2]}$$

(in Equation 1 above, $T_{SD}$ is a value (MPa) showing a difference in tensile strength measured between $-10°$ C. and $20°$ C., and in Equation 2 above, $T_{ED}$ is a value (%) showing a difference in tensile elongation measured between $-10°$ C. and $20°$ C.).

The aliphatic polycarbonate resin may be a polyalkylene carbonate resin, and the polyalkylene carbonate resin may be polyethylene carbonate, polypropylene carbonate or polybutylene carbonate and may have a weight average molecular weight of 5,000 to 100,000 g/mol.

The cold resistance improver may be contained in 5 to 100 parts by weight based on 100 parts by weight of the aliphatic polycarbonate resin, and the cold resistance improver may be a thermoplastic polyester elastomer or a mixture of a thermoplastic polyester elastomer and a thermoplastic polyurethane.

The thermoplastic polyester elastomer may be a copolymer of polyester (A) consisting of an aromatic dihydroxy compound and an aliphatic diol and polyether ester (B) consisting of an aromatic dihydroxy compound and an aliphatic polyol.

The cold resistance may include the following Chemical Formula 1:

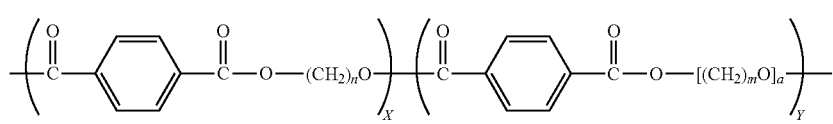

[Chemical Formula 1]

(in Chemical Formula 1 above, n and m are each independently an integer of 2 to 20, a is an integer of 2 to 50, and X and Y are each independently an integer of 1 to 100).

The cold resistance may include the following Chemical Formula 2:

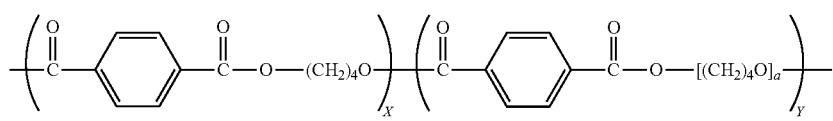

[Chemical Formula 2]

(in Chemical Formula 1 above, a is an integer of 2 to 25, and X and Y are each independently an integer of 1 to 50).

The thermoplastic polyurethane may be a copolymer of a hard segment (C) formed of polyurethane consisting of diisocyanate and an aliphatic or aromatic diol and a soft segment (B) formed of polyether ester consisting of an aromatic dihydroxy compound and an aliphatic polyol.

The thermoplastic polyurethane in the mixture of the thermoplastic polyester elastomer and the thermoplastic polyurethane may be contained in 20 to 500 parts by weight based on 100 parts by weight of the thermoplastic polyester elastomer.

The hot-melt adhesive composition may further include one or two or more kinds of additives selected from tackifying resins, plasticizers, waxes, antioxidants, elastomers, pigments, dyes, fillers, UV protecting agents, anti-static agents, anti-blocking agents, slip agents, inorganic fillers, kneading agents, stabilizers, modified resins, leveling agents, fluorescent brightening agents, dispersants, heat stabilizers, light stabilizers, ultraviolet light absorbers or lubricants.

In another general aspect, a hot-melt adhesive includes the hot-melt adhesive composition as described above, and the hot-melt adhesive may satisfy the following Equations 1 and 2:

$$0 \leq T_{SD} \leq 15 \quad \text{[Equation 1]}$$

$$0 \leq T_{ED} \leq 300 \quad \text{[Equation 2]}$$

(in Equation 1 above, $T_{SD}$ is a value (MPa) showing a difference in tensile strength measured between $-10°$ C. and $20°$ C., and in Equation 2 above, $T_{ED}$ is a value (%) showing a difference in tensile elongation measured between $-10°$ C. and $20°$ C.).

BRIEF DESCRIPTION OF THE DRAWINGS

FIG. 1 schematically shows adhesion measured between a hot-melt adhesive composition and an adhered agent of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Hereinafter, preferable exemplary embodiments and evaluation test details of a hot-melt adhesive composition having excellent cold resistance of the present invention will be described in detail. The present invention may be specifically appreciated by the following exemplary embodiments, and the exemplary embodiments are given by way of illustration but are not intended to limit the protective scope defined by the attached claims of the present invention.

The present invention is directed to a hot-melt adhesive composition containing an aliphatic polycarbonate and a cold resistance improver, wherein the aliphatic polycarbonate is obtained by copolymerization of carbon dioxide and at least one of different epoxide compounds.

The epoxide compound is at least one selected from a group consisting of (C2-C10)alkylene oxide substituted or unsubstituted with halogen or alkoxy; (C4-C20)cycloalkyleneoxide substituted or unsubstituted with halogen or alkoxy; and (C8-C20)styreneoxide substituted or unsubstituted with halogen, alkoxy, alkyl, or aryl.

Specific examples of alkoxy may include (C1-C20)alkyloxy, (C6-C20)aryloxy, (C6-C20)ar(C1-C20)alkyl(aralkyl)oxy, and the like, and specific examples of aryloxy may include phenoxy, biphenyloxy, naphthyloxy, and the like. The alkoxy, alkyl, and aryl may have a substituent group selected from halogen atoms or alkoxy groups.

More specifically, the aliphatic polycarbonate may be represented by the following Chemical Formula 3:

[Chemical Formula 3]

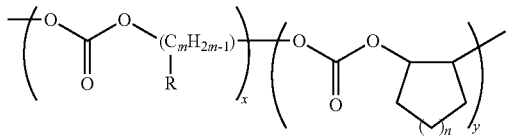

[in Chemical Formula 3, m is an integer of 2 to 10, n is an integer of 1 to 3; R is hydrogen, (C1-C4)alkyl, or —CH$_2$—O—R' (R' is (C1-C8)alkyl), and x:y is 5:95 to 99.99:0.01].

Specific examples of the epoxide compound according to the present invention include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrine, epichlorohydrine, epibromohydrine, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxidenorbornene, limonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxidepropyl ether, epoxypropyl methoxyphenyl ether, biphenyl glycidyl ether, glycidyl naphthyl ether, and the like.

As a method of polymerizing the aliphatic polycarbonate, there is a solution polymerization method or a bulk polymerization method. More specifically, polymerization is performed by injecting carbon dioxide in the presence of the epoxide compound and a catalyst while using an organic solvent as a reactive medium.

As the solvent, aliphatic hydrocarbons such as pentane, octane, decane, cyclohexane, and the like; aromatic hydrocarbons such as benzene, toluene, xylene, and the like; and halogenated hydrocarbons such as chloromethane, methylenechloride, chloroform, carbontetrachloride, 1,1-dichloroethane, 1,2-dichloethane, ethylchloride, trichloroethane, 1-chloropropane, 2-chloropropane, 1-chlorobutane, 2-chlorobutane, 1-chloro-2-methylpropane, chlorobenzene, bromobenzene, and the like, may be used alone or in combination of two or more thereof. The pressure of carbon dioxide may be from an atmospheric pressure up to 100 atm, preferably, 5 atm to 30 atm. The polymerization temperature at the time of copolymerization may be 20 to 120° C., preferably, 50 to 90° C. The bulk polymerization method using a monomer itself as a solvent may be more preferred.

The aliphatic polycarbonate polymerized by the above-described methods may be polyalkylene carbonate, wherein ene may include ethylene, propylene, 1-butylene, cyclohexene, alkyl glycidyl ether, n-butyl, n-octyl, and the like, but the present invention is not limited thereto.

In addition, a molecular weight of the aliphatic polycarbonate resin is not limited, but as a more substantial example, the hot-melt adhesive preferably has a weight average molecular weight of 5,000 to 100,000 g/mol, more preferably, 10,000 to 100,000 g/mol, in view of strong cohesion and low melting viscosity. In the case in which the weight average molecular weight is more than 100,000, when the hot-melt adhesive composition is melted, viscosity thereof is high, and in the case in which the weight average molecular weight is less than 5,000, cohesion thereof is weak, and therefore, adhesion thereof may be decreased.

The hot-melt adhesive composition of the present invention contains a cold resistance improver. The cold resistance improver, which is added in order to implement excellent tensile strength and flexibility even at a low temperature of 0° C. or less, preferably, 0 to −10° C., may be a thermoplastic polyester elastomer or a mixture of thermoplastic polyester elastomer and thermoplastic polyurethane.

The thermoplastic polyester elastomer is preferably a copolymer of a hard segment formed of polyester (A) consisting of an aromatic dihydroxy compound and an aliphatic diol and a soft segment formed of polyether ester (B) consisting of an aromatic dihydroxy compound and an aliphatic polyol.

The aromatic dihydroxy compound is not limited as long as it is a material for synthesizing a polyester resin in the art. For example, the aromatic dihydroxy compound may be one kind or two kinds or more selected from a phthalic acid, an isophthalic acid, a terephthalic acid, a 2,6-naphthalene dicarboxylic acid, and derivatives thereof, more preferably, a terephthalic acid and a naphthalene dicarboxylic acid.

The aliphatic diol is not limited as long as it is a material for synthesizing a polyester resin in the art. For example, the aliphatic diol may be one kind or two kinds or more selected from C2-C12 alkylene glycols such as ethylene glycol, trimethylene glycol, propylene glycol, 1,4-butanediol, hexanediol, and the like, more preferably, C2-C6 alkylene glycol.

In addition, the aliphatic polyol is not limited as long as it is a material for synthesizing a polyether ester resin in the art. For example, the aliphatic polyol is preferably a polyalkylene glycol having a plurality of C2-C6 alkylene units such as diethylene glycol, dipropylene glycol, ditetramethylene glycol, triethylene glycol, polytetramethylene glycol, and the like, more preferably, C2-C4 polyalkylene glycol.

In the copolymer of the polyester (A) and the polyether ester (B) of the thermoplastic polyester elastomer, it is preferred that the polyether ester (B) which is the soft segment is contained in 70 to 200 parts by weight based on 100 parts by weight of the polyester (A) which is the hard segment, more preferably, 100 to 150 parts by weight.

In the case in which a content of the soft segment (B) is less than 70 parts by weight, improvement in cold resistance of the hot-melt adhesive composition is not sufficient, such that flexibility may be deteriorated, brittleness may be increased, and tensile strength (fracture) may be decreased, and in the case in which a content thereof is more than 200 parts by weight, flexibility may be slightly improved, but mechanical strength such as tensile strength, and the like, may be decreased.

The copolymerization of the polyester (A) and the polyether ester (B) may be obtained by repeating general ester exchange reaction and depolymerization reaction, wherein catalyst is preferably added thereto in order to form a uniform cold resistance improver. As the catalyst, general titanium compounds such as titanium tetrabutoxide, potassium oxalate titanate, and the like, tin compounds such as dibutyltin oxide, monohydroxy butyltin oxide, and the like, and mixtures thereof, may be used. Combination of reaction temperature, concentration of the catalyst and reaction time in the copolymerization reaction may be optionally adjusted, and may be adjusted by the method known in the art according to kinds, contents, and other conditions of the polyester (A) which is the hard segment and the polyether ester (B) which is the soft segment.

It is preferred that the thermoplastic polyester elastomer is represented by the following Chemical Formula 1:

[Chemical Formula 1]

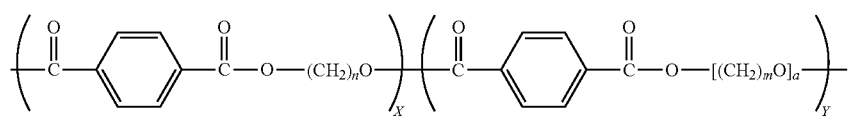

(in Chemical Formula 1 above, n and m are each independently an integer of 2 to 20, a is an integer of 2 to 50, and X and Y are each independently an integer of 1 to 100).

More specifically, it is preferred that the thermoplastic polyester elastomer is represented by the following Chemical Formula 2, but the present invention is not limited thereto:

[Chemical Formula 2]

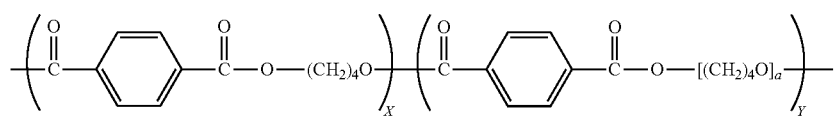

(in Chemical Formula 2 above, a is an integer of 2 to 25, and X and Y are each independently an integer of 1 to 50).

In addition, as the cold resistance improver, a mixture of the thermoplastic polyester elastomer and the thermoplastic polyurethane may be used.

It is preferred that the thermoplastic polyurethane is a copolymer of a hard segment (C) formed of polyurethane consisting of diisocyanate and an aliphatic or aromatic diol and a soft segment (B) formed of polyether ester consisting of an aromatic dihydroxy compound and an aliphatic polyol.

The diisocynate is not limited as long as it is a material is for synthesizing polyurethane in the art. For example, the diisocynate may be one kind or two or more kinds selected from 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, cyclohexane-1,4-diisocyanate, 1,5-naphthalene diisocyanate, 1,6-hexamethylene diisocyanate, 4,6 xylene diisocyanate, isophorone diisocyanate, more preferably, 4,4'-diphenylmethane diisocyanate, 1,6-hexamethylene diisocyanate or 2,6-toluene diisocyanate.

In addition, monoisocyanate or polyisocyanate in a content of 1 to 10 wt % based on the weight of the diisocyanate may be further contained therein.

The aliphatic or aromatic diol forming polyurethane (C) is not limited as long as it is a material for synthesizing polyurethane in the art. For example, the aliphatic or aromatic diol may be one kind or two or more kinds selected from ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis(hydroxy ethylene) terephthalate, hydroquinone bis(2-hydroxy-ethyl)ether, cyclohexane dimethanol and bis(2-hydroxyethyl)bisphenol A, more preferably, ethylene glycol, 1,3-propanediol, 1,4-butanediol or 2-methyl-1,3-propane diol.

In order to improve compatibility with the aliphatic polycarbonate resin, it is effective that the soft segment (D) of the thermoplastic polyurethane is the same as the soft segment (B) used in the above-described thermoplastic polyester elastomer.

In the case in which the mixture of the thermoplastic polyester elastomer and the thermoplastic polyurethane is used, may a ratio be appropriately increased or decreased according to a desired purpose, and in particular, the thermoplastic polyurethane is preferably contained in 20 to 500 parts by weight based on 100 parts by weight of the thermoplastic polyester elastomer.

In the case in which a content of the thermoplastic polyurethane is less than 20 parts by weight, flexibility at a low temperature and adhesion may not be significantly improved, and in the case in which a content thereof is more than 500 parts by weight, compatibility is decreased and viscosity is extremely high, thereby causing a problem in processability, such that the thermoplastic polyurethane is preferably contained in the above-described range.

The cold resistance improver, which serves to provide elasticity and strength of the aliphatic polycarbonate resin at a low temperature of 0° C. or less, may maintain excellent mechanical strength as the same as that of the aliphatic polycarbonate resin, and provide elasticity and flexibility, and as compared to the existing hot-melt adhesive, the hot-melt adhesive composition of the present invention may implement high strength and elasticity at a low temperature and more improve adhesion.

In addition, the cold resistance improver has excellent compatibility with the aliphatic polycarbonate resin to remarkably reduce a bleeding phenomenon on a surface of the adhesive and a surface tackiness.

A content of the cold resistance improver may be appropriately increased or decreased according to purposes to be used. It is general to contain the cold resistance improver in a content of 5 to 100 parts by weight based on 100 parts by weight of the aliphatic polycarbonate resin, and in particular, the cold resistance improver in a content of 10 to 50 parts by weight is preferred since an efficiency to improve cold resistance is increased in comparison an added amount thereof, without hindering processability.

In the case in which a content of the cold resistance improver is less than 5 parts by weight, an effect of improving cold resistance may not be sufficient, the hot-melt adhesive may be easily fractured at 0° C. or less, thereby having difficulty in securing cold resistance, and in the case in which a content of the cold resistance improver is more than 100 parts by weight, compatibility may be deteriorated, and viscosity may be increased, thereby decreasing processability.

The hot-melt adhesive composition containing the cold resistance improver according to an exemplary embodiment of the present invention has a tensile strength of 1 to 30 MPa and a tensile elongation of 50 to 900% at 10° C., a tensile strength of 1 to 45 MPa and a tensile elongation of 30 to 600% at 0° C., a tensile strength of 1 to 50 MPa and a tensile elongation of 5 to 300% at −10° C., such that it is preferred that the hot-melt adhesive composition of the present invention satisfy the following Equations 1 and 2:

$$0 \leq T_{SD} \leq 15 \quad \text{[Equation 1]}$$

$$0 \leq T_{ED} \leq 300 \quad \text{[Equation 2]}$$

(in Equation 1 above, $T_{SD}$ is a value (MPa) showing a difference in tensile strength measured between −10° C. and 20° C., and in Equation 2 above, $T_{ED}$ is a value (%) showing a difference in tensile elongation measured between −10° C. and 20° C.).

Therefore, it may be appreciated that the holt-melt adhesive composition containing the cold resistance improver according to an exemplary embodiment of the present invention may implement sufficient strength and elasticity and may have strength as the same as that of the aliphatic polycarbonate even at a low temperature of 0° C. or less.

In addition, the hot-melt adhesive composition of the present invention may further contain at least one of additives selected from tackifying resins, plasticizers, waxes, antioxidants, elastomers, pigments, dyes, fillers, UV protecting agents, anti-static agents, anti-blocking agents, slip agents, inorganic fillers, kneading agents, stabilizers, modified resins, leveling agents, fluorescent brightening agents, dispersants, heat stabilizers, light stabilizers, ultraviolet light absorbers or lubricants, and is not limited but usable as long as a material is an additive which is clearly used in the art.

Hereinafter, examples will be provided in order to specifically describe the present invention in more detail. However, the present invention is not limited to the following Examples.

Example 1

10 parts by weight of a cold resistance improver (polybutylene terephthalate-polytetramethylene terephthalate, weight average molecular weight: 100,000), 30 parts by weight of a tackifying resin (Terpene Phenols, Softening Point: 105° C.) and 15 parts by weight of a plasticizer (Trade Name: Daifatty 101) were added to a polypropylene carbonate resin (SK energy, GreenPol™) having a weight average molecular weight 30,000 g/mol, followed by stirring in Brabender mixer at 160° C. for 5 minutes, thereby preparing a hot-melt adhesive.

The prepared hot-melt adhesive was used to prepare a dumbbell-shaped tensile test specimen in accordance with ASTM standard D638, and each tensile strength and tensile elongation were measured with a speed of 500 mm/min at 10° C., 5° C., 0° C., −5° C., −10° C. in accordance with ASTM638. Results thereof were shown in the following Table 1.

In addition, specimens having a size of 2 mm (width)×10 mm (length)×1 mm (thickness) were prepared and put into a place at each 10° C., 5° C., 0° C., −5° C., and −10° C. for 2 hours, and took out therefrom, and then the specimens were broken by holding both ends thereof with hands and applying power thereto, thereby testing brittleness of the hot-melt adhesive, wherein a case where the average number of the broken specimens in 10 times of repeated tests was less than 1 time was indicated by '⊙', a case where the average number thereof was 2 times to 4 times was indicated by 'Δ' and a case where the average number thereof was 5 times or more was indicated by 'X', which was shown in the following Table 2.

Further, as shown in FIG. 1, a hot-melt specimen having a size of 25 mm×10 mm was adhered between two adhered materials having each size of 25 mm×100 mm at a temperature of 160° C. for 30 seconds and then a shear adhesion thereof was measured using universal testing machine (UTM). Here, a speed of the test was 50 mm/min, and results thereof was shown in the following Table 3.

In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 2

Example 2 was conducted as the same as Example 1 above except for using 20 parts by weight of the cold resistance improver. In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 3

Example 3 was conducted as the same as Example 1 above except for using 30 parts by weight of the cold resistance improver. In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 4

Example 4 was conducted as the same as Example 1 above except for using 10 parts by weight of a cold resistance improver (polybutyleneterephthalate-polytetramethylene terephthalate, weight average molecular weight: 30,000). In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 5

Example 5 was conducted as the same as Example 4 above except for using 20 parts by weight of the cold resistance improver. In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 6

Example 6 was conducted as the same as Example 4 above except for using 30 parts by weight of the cold resistance improver. In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 7

Example 7 was conducted as the same as Example 1 above except for using a cold resistance improver prepared by mixing 10 parts by weight of polybutyleneterephthalate-polytetramethylene terephthalate having a weight average molecular weight of 100,000 and 10 parts by weight of a thermoplastic polyurethane (Sambu Fine Chemicals Co., Ltd, 7120H). In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 8

Example 8 was conducted as the same as Example 7 above except for using a cold resistance improver prepared by mixing 10 parts by weight of polybutyleneterephthalate-polytetramethylene terephthalate having a weight average molecular weight of 100,000 and 30 parts by weight of a thermoplastic polyurethane (Sambu Fine Chemicals Co., Ltd, 7120H). In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Example 9

Example 9 was conducted as the same as Example 1 above except for using polyethylene carbonate (Weight Average Molecular Weight: 30,000 g/mol, SK Energy) rather than polypropylene carbonate. In addition, the prepared adhesive was molded by a sheet shape and two sheets thereof were stacked and left at 30° C. for 6 hours, and then, tackiness thereof was confirmed, and as a result, it was confirmed that two sheets were not adhered to each other.

Comparative Example 1

Comparative Example 1 was conducted as the same as Example 1 above except for not using a cold resistance improver. In addition, the prepared adhesive was molded by a sheet shape and two sheets thereof were stacked and left at 30° C. for 6 hours, and then, tackiness thereof was confirmed, and as a result, it was confirmed that damage of sheets was large due to an extreme blocking phenomenon between sheets.

Comparative Example 2

Comparative Example 2 was conducted as the same as Example 1 above except for using 100 parts by weight of a cold resistance improver (polybutyleneterephthalate-polytetramethylene terephthalate, weight average molecular weight: 30,000). In addition, the prepared adhesive was molded by a sheet shape and two sheets thereof were stacked and left at 30° C. for 6 hours, and then, tackiness thereof was confirmed, and as a result, it was confirmed that two sheets were not adhered to each other. However, since compatibility was not good, domain was observed and a bleeding phenomenon occurred at the time of being measured by SEM.

Comparative Example 3

Comparative Example 3 was conducted as the same as Example 1 above except for adding 10 parts by weight of dimethyl polyethylene glycol (Mw 500) rather than using a cold resistance improver. In addition, the prepared adhesive was molded by a sheet shape and two sheets thereof were stacked and left at 30° C. for 6 hours, and then, tackiness thereof was confirmed, and as a result, it was confirmed that two sheets were completely adhered to each other and were not separated from each other.

Comparative Example 4

Comparative Example 4 was conducted as the same as Example 7 above except for using a cold resistance improver prepared by mixing 10 parts by weight of polybutyleneterephthalate-polytetramethylene terephthalate having a weight average molecular weight of 100,000 and 60 parts by weight of a thermoplastic polyurethane (Sambu Fine Chemicals Co., Ltd, 7120H). In addition, the prepared adhesive was molded by a sheet shape and two sheets thereof were stacked and left at 30° C. for 6 hours, and then, tackiness thereof was confirmed, and as a result, it was confirmed that two sheets were not adhered to each other; however, since compatibility was not good, the prepared sheet of Comparative Example 4 was easily fractured.

TABLE 1

|  |  | 20° C. | 10° C. | 0° C. | −5° C. | −10° C. |
|---|---|---|---|---|---|---|
| EXAMPLE 1 | TENSILE STRENGTH (MPa) | 8.86 | 8.78 | 9.23 | 15.66 | 18.82 |
|  | TENSILE ELONGATION (%) | 300 | 290 | 300 | 10 | 7 |

TABLE 1-continued

| | | 20° C. | 10° C. | 0° C. | −5° C. | −10° C. |
|---|---|---|---|---|---|---|
| EXAMPLE 2 | TENSILE STRENGTH (MPa) | 11.22 | 11.88 | 12.28 | 13.00 | 19.03 |
| | TENSILE ELONGATION (%) | 360 | 340 | 330 | 320 | 70 |
| EXAMPLE 3 | TENSILE STRENGTH (MPa) | 14.64 | 14.32 | 14.83 | 15.49 | 16.22 |
| | TENSILE ELONGATION (%) | 380 | 370 | 380 | 300 | 280 |
| EXAMPLE 4 | TENSILE STRENGTH (MPa) | 6.45 | 7.81 | 14.2 | 18.2 | 19.31 |
| | TENSILE ELONGATION (%) | 280 | 200 | 80 | 10 | 4 |
| EXAMPLE 5 | TENSILE STRENGTH (MPa) | 8.69 | 8.31 | 9.32 | 17.2 | 21.5 |
| | TENSILE ELONGATION (%) | 300 | 320 | 250 | 100 | 2 |
| EXAMPLE 6 | TENSILE STRENGTH (MPa) | 10.02 | 12.81 | 18.24 | 22.73 | 20.79 |
| | TENSILE ELONGATION (%) | 320 | 280 | 320 | 180 | 30 |
| EXAMPLE 7 | TENSILE STRENGTH (MPa) | 14.13 | 14.55 | 15.12 | 15.49 | 18.24 |
| | TENSILE ELONGATION (%) | 360 | 370 | 330 | 300 | 200 |
| EXAMPLE 8 | TENSILE STRENGTH (MPa) | 18.53 | 20.42 | 19.44 | 20.53 | 22.77 |
| | TENSILE ELONGATION (%) | 380 | 370 | 280 | 320 | 270 |
| EXAMPLE 9 | TENSILE STRENGTH (MPa) | 7.72 | 7.6 | 8.23 | 10.78 | 16.62 |
| | TENSILE ELONGATION (%) | 370 | 370 | 330 | 270 | 80 |
| COMPARATIVE EXAMPLE 1 | TENSILE STRENGTH (MPa) | 5.27 | 13.11 | 18.08 | 22.2 | 28.4 |
| | TENSILE ELONGATION (%) | 680 | 30 | 0 | 0 | 0 |
| COMPARATIVE EXAMPLE 2 | TENSILE STRENGTH (MPa) | 0.84 | 1.32 | 0.83 | 1.17 | 2.21 |
| | TENSILE ELONGATION (%) | 10 | 0 | 0 | 0 | 0 |
| COMPARATIVE EXAMPLE 3 | TENSILE STRENGTH (MPa) | 0.92 | 1.2 | 1.82 | 2.02 | 3.45 |
| | TENSILE ELONGATION (%) | >1000 | >1000 | 980 | 920 | 790 |
| COMPARATIVE EXAMPLE 4 | TENSILE STRENGTH (MPa) | 2.01 | 1.21 | 2.31 | 1.21 | 1.33 |
| | TENSILE ELONGATION (%) | 0 | 8 | 4 | 0 | 0 |

TABLE 2

| | $T_{SD}$ | $T_{ED}$ |
|---|---|---|
| EXAMPLE 1 | 9.96 | 293 |
| EXAMPLE 2 | 7.81 | 290 |
| EXAMPLE 3 | 1.58 | 100 |
| EXAMPLE 4 | 12.86 | 276 |
| EXAMPLE 5 | 12.81 | 298 |
| EXAMPLE 6 | 10.77 | 290 |
| EXAMPLE 7 | 4.11 | 160 |
| EXAMPLE 8 | 4.24 | 110 |
| EXAMPLE 9 | 8.90 | 290 |
| COMPARATIVE EXAMPLE 1 | 23.13 | 680 |
| COMPARATIVE EXAMPLE 2 | 1.37 | Non-Compatible |
| COMPARATIVE EXAMPLE 3 | 2.53 | Non-Measurable |
| COMPARATIVE EXAMPLE 4 | 10.68 | 0 |

TABLE 3

| | 20° C. | 5° C. | 0° C. | −5° C. | −10° C. |
|---|---|---|---|---|---|
| EXAMPLE 1 | ◎ | ◎ | ◎ | Δ | x |
| EXAMPLE 2 | ◎ | ◎ | ◎ | ◎ | Δ |
| EXAMPLE 3 | ◎ | ◎ | ◎ | ◎ | ◎ |
| EXAMPLE 4 | ◎ | ◎ | Δ | Δ | x |
| EXAMPLE 5 | ◎ | ◎ | ◎ | Δ | x |
| EXAMPLE 6 | ◎ | ◎ | ◎ | ◎ | Δ |
| EXAMPLE 7 | ◎ | ◎ | ◎ | ◎ | ◎ |
| EXAMPLE 8 | ◎ | ◎ | ◎ | ◎ | ◎ |
| EXAMPLE 9 | ◎ | ◎ | ◎ | ◎ | Δ |
| COMPARATIVE EXAMPLE 1 | x | — | — | — | — |
| COMPARATIVE EXAMPLE 2 | x | — | — | — | — |
| COMPARATIVE EXAMPLE 3 | ◎ | ◎ | ◎ | ◎ | ◎ |
| COMPARATIVE EXAMPLE 4 | x | — | — | — | — |

TABLE 4

| | Shear Adhesion (Kgf) | | | | |
|---|---|---|---|---|---|
| | Steel | Wood | Glass | Polycarbonate | Polyurethane |
| EXAMPLE 1 | 77.2 | 82.6 | 18.3 | 22.2 | 19.2 |
| EXAMPLE 2 | 80.4 | 88.0 | 24.5 | 24.3 | 22.8 |
| EXAMPLE 3 | 79.2 | 89.3 | 28.3 | 28.5 | 27.6 |
| EXAMPLE 4 | 72.1 | 79 | 14.8 | 20.6 | 16 |
| EXAMPLE 5 | 74.6 | 82.8 | 20.2 | 23.4 | 20.2 |
| EXAMPLE 6 | 78.6 | 86 | 25.3 | 25 | 25.7 |
| EXAMPLE 7 | 80 | 88 | 30.8 | 27.4 | 27 |
| EXAMPLE 8 | 88.2 | 89.2 | 38.8 | 33.1 | 42.8 |
| EXAMPLE 9 | 72.2 | 78.5 | 22.8 | 26.3 | 18.8 |
| COMPARATIVE EXAMPLE 1 | 70.8 | 78 | 14.2 | 18.4 | 14.7 |
| COMPARATIVE EXAMPLE 2 | 12 | 34 | 0.8 | 3.3 | 2.4 |
| COMPARATIVE EXAMPLE 3 | 0.8 | 12 | 1.0 | 2.8 | 2.5 |
| COMPARATIVE EXAMPLE 4 | 12 | 42 | 1.8 | 5.2 | 11.1 |

It may be appreciated from Tables 1 to 4 above that Examples 1 to 8 according to the present invention showed excellent tensile strength, elasticity, and adhesion even at a low temperature, by adding the cold resistance improver thereto, as compared to Comparative Examples 1 to 4.

In addition, as shown in Examples 7 and 8, it may be appreciated that when using the mixture of the thermoplastic polyester elastomer and the thermoplastic polyurethane as the cold resistance improver, tensile strength, elasticity, and adhesion at a low temperature were excellent as compared to a case of using the thermoplastic polyester elastomer alone.

In addition, as shown in Example 9, it may be appreciated that even though the polyethylene carbonate was used rather than using polypropylene carbonate, compatibility with the cold resistance improver was excellent and properties similar to polypropylene carbonate were shown.

Further, it may be appreciated that in Comparative Example 4, the mixture of the thermoplastic polyester elastomer and the thermoplastic polyurethane as the cold resistance improver was used; however, excessive amount of the thermoplastic polyurethane was added thereto, such that compatibility with the aliphatic polycarbonate resin was hindered, and therefore, desired physical properties were not shown.

Therefore, the present invention may provide the hot-melt adhesive composition capable of maintaining high strength property of the aliphatic polycarbonate even at a low temperature, having excellent compatibility between the aliphatic polycarbonate resin and the cold resistance improver, to remarkably reduce the bleeding phenomenon on the surface of the adhesive and the surface tackiness, thereby having an improved adhesion.

The hot-melt adhesive composition of the present invention may include the aliphatic polycarbonate resin and the cold resistance improver, such that high strength property of the aliphatic polycarbonate resin may be maintained even at a low temperature and adhesion thereof may be improved.

In addition, the hot-melt adhesive composition may have excellent compatibility between the aliphatic polycarbonate resin and the cold resistance improver to remarkably reduce the bleeding phenomenon on the surface of the adhesive and the surface tackiness.

What is claimed is:

1. A hot-melt adhesive composition comprising:
    an aliphatic polycarbonate resin, a cold resistance improver, and a tackifying resin,
    wherein a tensile strength at −10° C. is 1 to 50 MPa, a tensile elongation at −10° C. is 5 to 300%, the cold resistance improver is selected from the group consisting of a thermoplastic polyester elastomer and a mixture of a thermoplastic polyester elastomer and a thermoplastic polyurethane, and the cold resistance improver is contained in the composition at 5 to 100 parts by weight based on 100 parts by weight of the aliphatic polycarbonate resin.

2. The hot-melt adhesive composition of claim 1, wherein the composition satisfies the following Equations 1 and 2:

$$0 \leq T_{SD} \leq 15 \qquad \text{[Equation 1]}$$

$$0 \leq T_{ED} \leq 300 \qquad \text{[Equation 2]}$$

in Equation 1 above, $T_{SD}$ is a value (MPa) showing a difference in tensile strength measured between −10° C. and 20° C., and in Equation 2 above, $T_{ED}$ is a value (%) showing a difference in tensile elongation measured between −10° C. and 20° C.

3. The hot-melt adhesive composition of claim 1, wherein the aliphatic polycarbonate resin is a polyalkylene carbonate resin.

4. The hot-melt adhesive composition of claim 3, wherein the polyalkylene carbonate resin has a weight average molecular weight of 5,000 to 100,000 g/mol.

5. The hot-melt adhesive composition of claim 3, wherein the polyalkylene carbonate resin is polyethylene carbonate, polypropylene carbonate, or polybutylene carbonate.

6. The hot-melt adhesive composition of claim 5, wherein the thermoplastic polyester elastomer is a copolymer of polyester (A) consisting of an aromatic dihydroxy compound and an aliphatic diol and polyether ester (B) consisting of an aromatic dihydroxy compound and an aliphatic polyol.

7. The hot-melt adhesive composition of claim 6, wherein the thermoplastic polyester elastomer is represented by the following Chemical Formula 1:

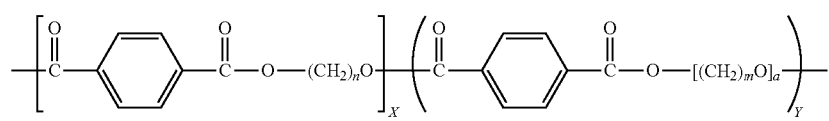

[Chemical Formula 1]

in Chemical Formula 1 above, n and m are each independently an integer of 2 to 20, a is an integer of 2 to 50, and X and Y are each independently an integer of 1 to 100.

8. The hot-melt adhesive composition of claim 1, wherein the thermoplastic polyurethane is a copolymer of a hard segment (C) formed of polyurethane consisting of diisocyanate and an aliphatic or aromatic diol and a soft segment (B) formed of polyether ester consisting of an aromatic dihydroxy compound and an aliphatic polyol.

9. The hot-melt adhesive composition of claim 1, wherein the thermoplastic polyurethane in the mixture of the thermoplastic polyester elastomer and the thermoplastic polyurethane is contained in 20 to 500 parts by weight based on 100 parts by weight of the thermoplastic polyester elastomer.

10. The hot-melt adhesive composition of claim 1, further comprising one or more additives selected from the group consisting of: plasticizers, waxes, antioxidants, elastomers, pigments, dyes, fillers, UV protecting agents, anti-static agents, anti-blocking agents, slip agents, inorganic fillers, kneading agents, stabilizers, modified resins, leveling agents, fluorescent brightening agents, dispersants, heat stabilizers, light stabilizers, ultraviolet light absorbers, and lubricants.

* * * * *